US009810436B2

(12) United States Patent
Mayberry et al.

(10) Patent No.: US 9,810,436 B2
(45) Date of Patent: Nov. 7, 2017

(54) DUAL INLET GRIDDLE/GRILL BURNER HAVING MULTIPLE BURNER CONFIGURATIONS

(71) Applicant: Whirlpool Corporation, Benton Harbor, MI (US)

(72) Inventors: Timothy A. Mayberry, Saint Joseph, MI (US); Kyle A. Walters, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 175 days.

(21) Appl. No.: 14/812,191

(22) Filed: Jul. 29, 2015

(65) Prior Publication Data

US 2017/0030585 A1 Feb. 2, 2017

(51) Int. Cl.
*F24C 3/08* (2006.01)
*F24C 3/12* (2006.01)
*F23D 14/04* (2006.01)
*F24C 3/10* (2006.01)
*A47J 37/06* (2006.01)
*F23D 14/06* (2006.01)
*F23D 23/00* (2006.01)

(52) U.S. Cl.
CPC .............. *F24C 3/12* (2013.01); *A47J 37/0682* (2013.01); *F23D 14/045* (2013.01); *F23D 14/06* (2013.01); *F23D 23/00* (2013.01); *F24C 3/085* (2013.01); *F24C 3/10* (2013.01); *F23D 2207/00* (2013.01); *F23N 2037/02* (2013.01)

(58) Field of Classification Search
CPC ................................ F24C 3/08; F23C 14/045
USPC ................................................ 126/39 N, 1 R
See application file for complete search history.

(56) References Cited

U.S. PATENT DOCUMENTS

| 964,611 A | 7/1910 | Clausing |
| 4,409,954 A | 10/1983 | Berlik et al. |
| 4,413,610 A | 11/1983 | Berlik |
| 4,457,293 A | 7/1984 | Berlik |
| 4,705,019 A | 11/1987 | Beach et al. |
| 4,836,180 A | 6/1989 | Walters et al. |
| 6,017,211 A | 1/2000 | Gort et al. |
| 7,527,495 B2 | 5/2009 | Yam et al. |

(Continued)

FOREIGN PATENT DOCUMENTS

WO 2009078674 6/2009

*Primary Examiner* — Avinash Savani
(74) *Attorney, Agent, or Firm* — Price Heneveld LLP

(57) ABSTRACT

A grilling appliance includes first and second fuel delivery ports extending from a grill housing, a first burner element selectively connected to one of the first and second fuel delivery ports to define a single-burner condition, a second burner element selectively connected to the other of the first and second fuel delivery ports to define, with the first burner element, a twin-burner condition, an elongated burner element having two fuel inlets selectively connected to the first and second fuel delivery ports to define, when the first and second burner elements are removed from the first and second fuel delivery ports and a large-burner condition. At least one ignitor is in communication with the first burner element in the single-burner condition, the first and second burner elements in the twin-burner condition and the elongated burner element in the large-burner condition.

18 Claims, 7 Drawing Sheets

(56) References Cited

U.S. PATENT DOCUMENTS

| | | | |
|---|---|---|---|
| 8,011,358 B2 | 9/2011 | Galindo et al. | |
| 8,033,279 B2 * | 10/2011 | Shaffer | F24C 3/126 126/1 R |
| 8,978,637 B2 | 3/2015 | Ryu et al. | |
| 2009/0205631 A1 | 8/2009 | Tsung | |
| 2010/0126495 A1 | 5/2010 | Shaffer | |

* cited by examiner

DUAL INLET GRIDDLE/GRILL BURNER HAVING MULTIPLE BURNER CONFIGURATIONS

BACKGROUND

This device is in the field of grilling appliances for cooking food items, specifically, a grilling appliance having dual inlets that can interchangeably receive various burners to define a plurality of burner configurations.

SUMMARY

In at least one aspect, a grilling appliance includes first and second fuel delivery ports extending from a grill housing. A removable first burner element is selectively connected to one of the first and second fuel delivery ports to define a single-burner condition. A removable second burner element is selectively connected to the other of the first and second fuel delivery ports to define, with the first burner, a twin-burner condition. A removable elongated burner element having two fuel inlets is selectively connected to the first and second fuel delivery ports to define, when the first and second burner elements are removed from the first and second fuel delivery ports, a large-burner condition. At least one ignitor is in communication with the first burner element in the single-burner condition, the first and second burner elements in the twin-burner condition and the elongated burner element in the large-burner condition.

In at least another aspect, a grilling appliance includes first and second fuel delivery ports in selective communication with at least one ignitor. First and second small burner elements are selectively engagable with at least one of the first and second fuel delivery ports to define a small-burner condition and a twin-burner condition, wherein the small burner condition is defined by one of the first and second small burner elements being in communication with one of the first and second fuel delivery ports and the other of the first and second small burner elements being out of communication with the other of the first and second fuel delivery ports, and wherein the twin-burner condition is defined by the first small burner element being in communication with one of the first and second fuel delivery ports and the second small burner element being in communication with the other of the first and second fuel delivery ports. An elongated burner element is alternatively engagable with the first and second fuel delivery ports to define a large-burner condition.

In at least another aspect, a grilling appliance includes a set of burner elements, a plurality of fuel delivery ports, wherein the set of burner elements are selectively and interchangeably engaged with at least one of the fuel delivery ports to define a plurality of burner conditions. At least one ignitor is in communication with the plurality of fuel delivery ports in each of the burner conditions, wherein the at least one ignitor is in a fixed position with respect to the plurality of fuel delivery ports.

These and other features, advantages, and objects of the present device will be further understood and appreciated by those skilled in the art upon studying the following specification, claims, and appended drawings.

DETAILED DESCRIPTION OF EMBODIMENTS

Figure 1:
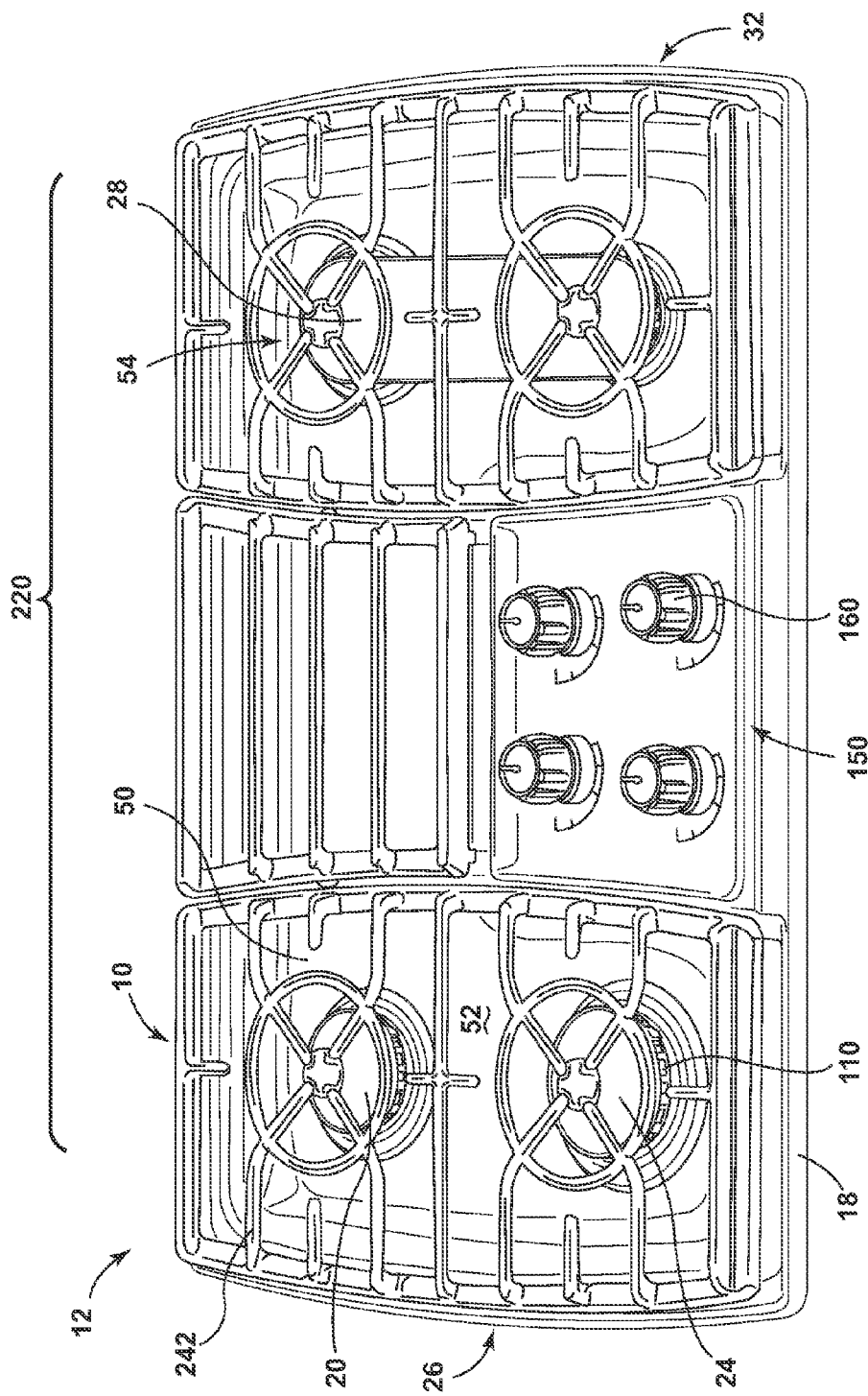
FIG. 1 is a top perspective view of a grilling appliance incorporating an aspect of the interchangeable dual inlet burners.
Figure 2:
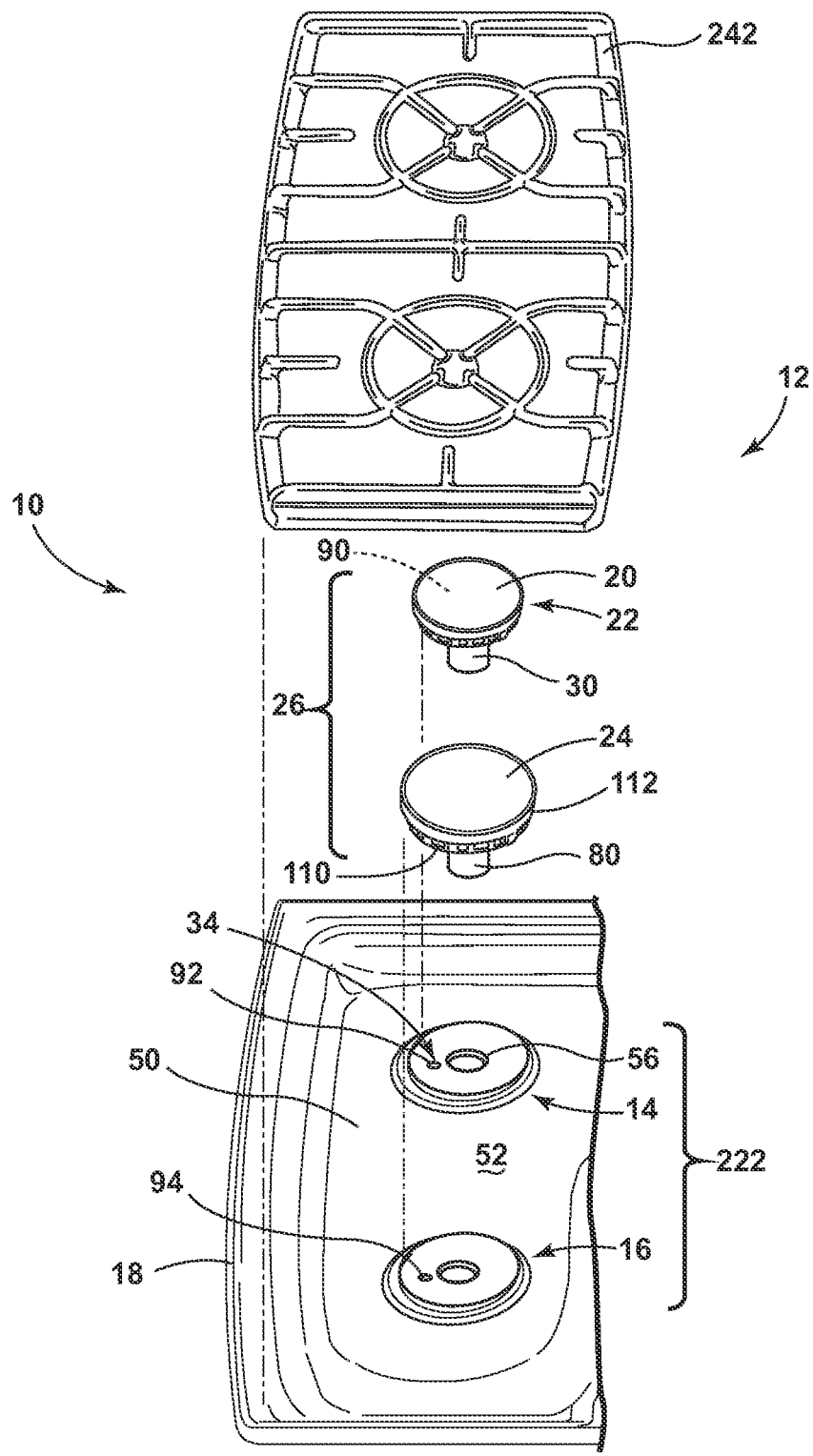
FIG. 2 is a partially exploded top perspective view of a portion of the grilling appliance of FIG. 1 showing the first and second small burner elements separated from the first and second fuel delivery ports and the grate positioned above the first and second small burner elements.
Figure 3:
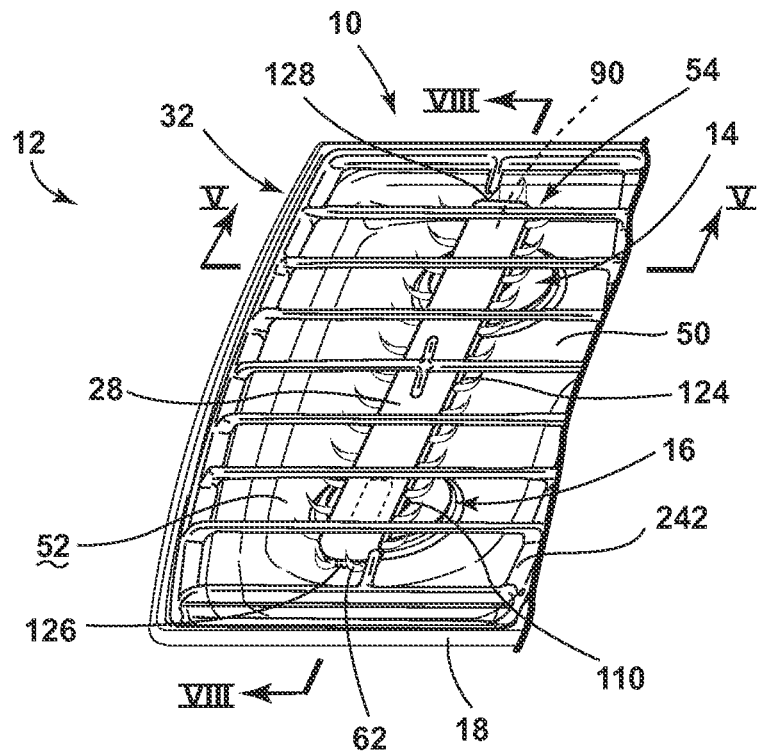
FIG. 3 is a top perspective view of an aspect of a grilling appliance, incorporating the interchangeable dual inlet burners and having the elongated burner element installed within the first and second fuel delivery ports.
Figure 5:
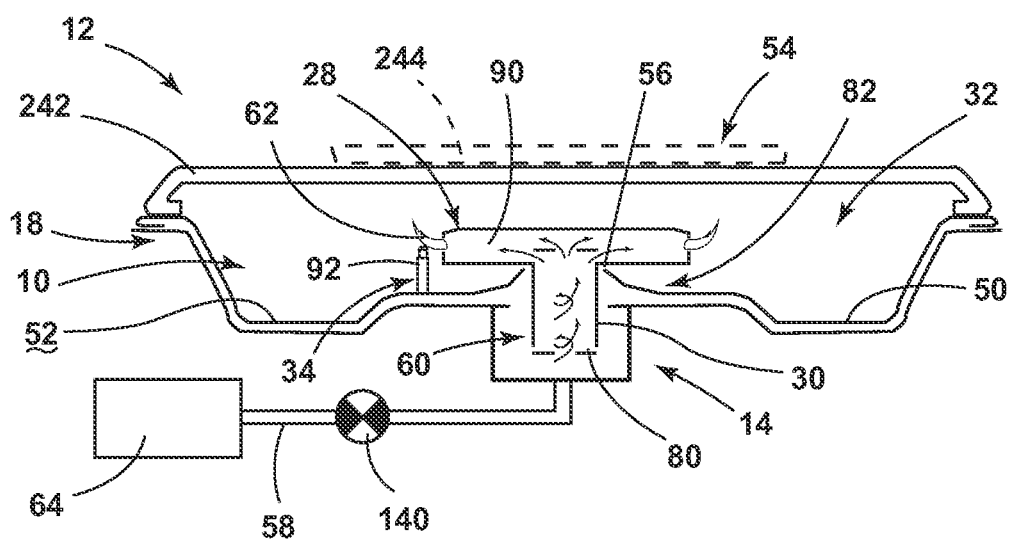
FIG. 5 is a cross-sectional view of the grilling appliance of FIG. 3 taken along line V-V.
Figure 4:
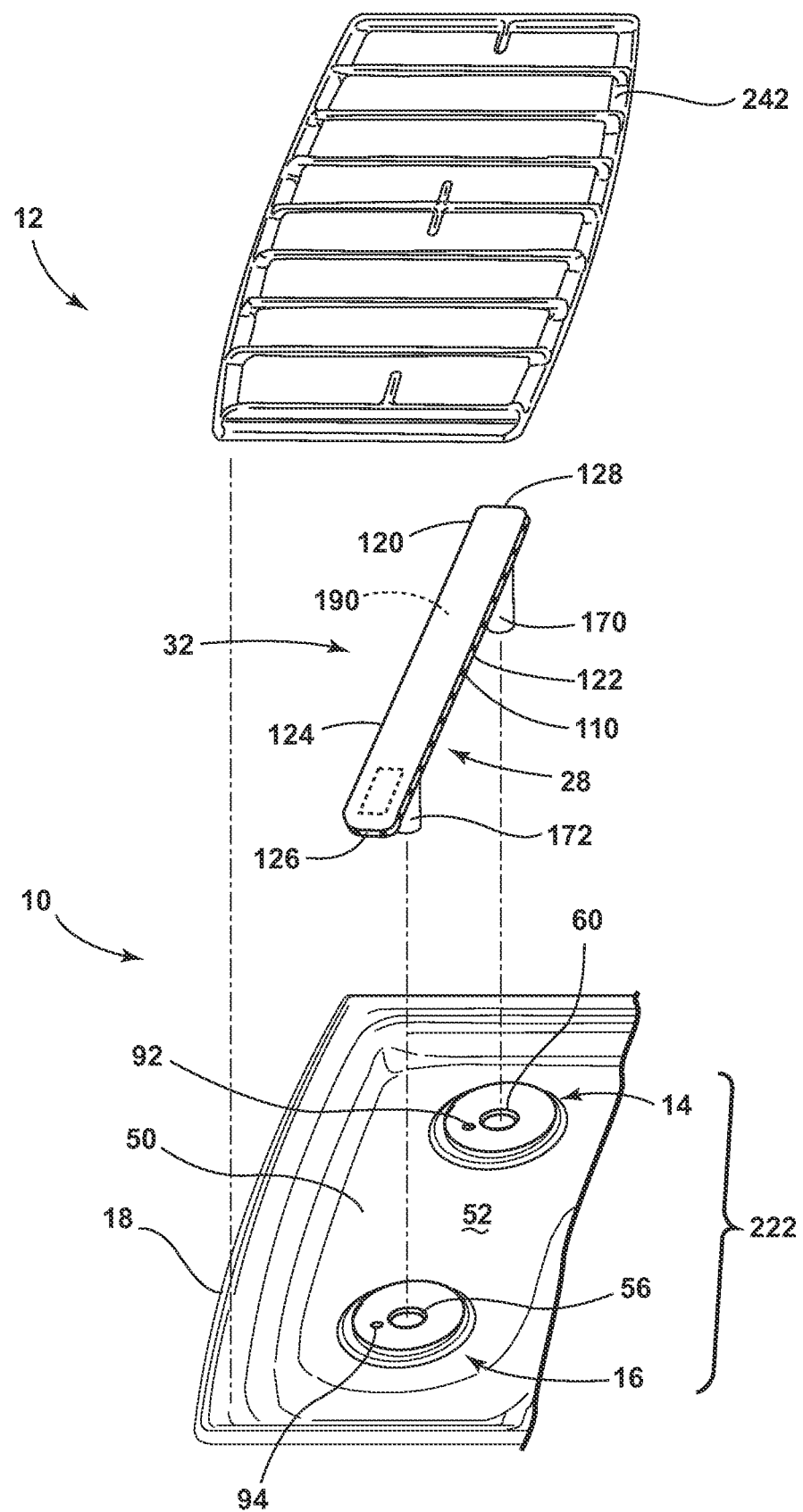
FIG. 4 is a top exploded perspective view of the grilling appliance of FIG. 3.
Figure 6:
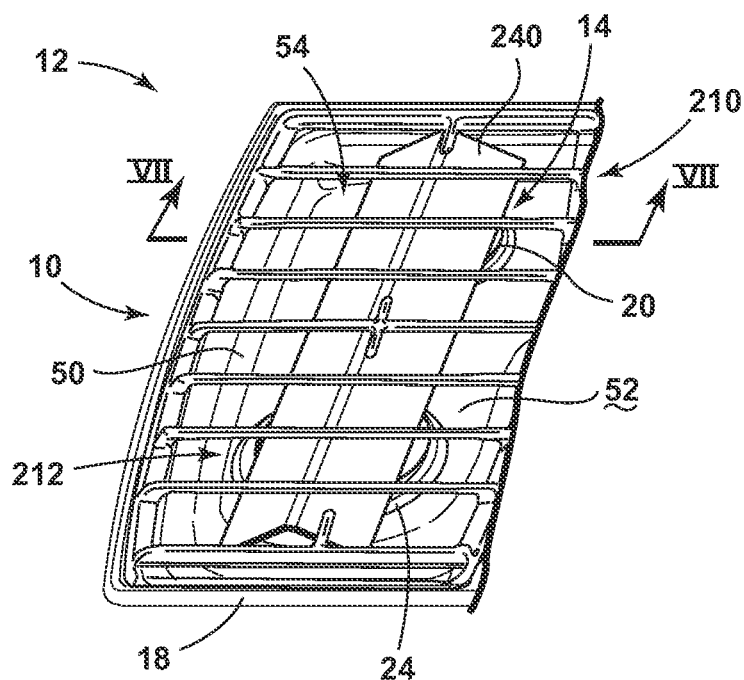
FIG. 6 is a top perspective view of an aspect of the grilling appliance incorporating the interchangeable dual inlet burners and having a radiant heat shield disposed above the first and second fuel delivery ports.
Figure 7:
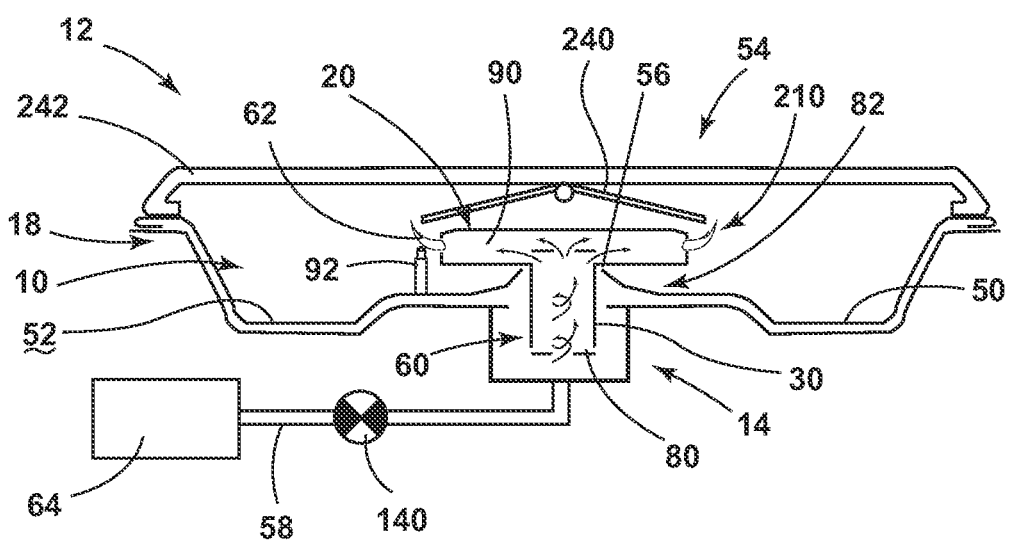
FIG. 7 is a cross-sectional view of the grilling appliance of FIG. 6 taken along line VII-VII.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-5, reference numeral 10 generally refers to an interchangeable dual inlet burner system 10 incorporated within a grilling appliance 12. The grilling appliance 12 includes first and second fuel delivery ports 14, 16 that extend from a grill housing 18. A removable first small burner element 20 is selectively connected to one of the first and second fuel delivery ports 14, 16 to define a single-burner condition 22. A removable second small burner element 24 is selectively connected to the other of the first and second fuel delivery ports 14, 16 to define, in cooperation with the removable first small burner element 20, a twin-burner condition 26. A removable elongated burner element 28 having two fuel inlets 30 is selectively connected to the first and second fuel delivery ports 14, 16 to define, when the first and second small burner elements 20, 24 are removed from the first and second fuel delivery ports 14, 16, a large-burner condition 32. At least one ignitor 34 is in communication with the first small burner element 20 in the single-burner condition 22, the first and second small burner elements 20, 24 in the twin-burner condition 26, and the elongated burner element 28 in the large-burner condition 32. It is contemplated that the at least one ignitor 34 is in a fixed position within the grill housing 18 in each of the single-burner, twin-burner and large-burner conditions 22, 26, 32.

Referring again to FIGS. 1-5, the interchangeable dual inlet burner system 10 can be implemented within various grilling appliances 12 having a gaseous fuel source 64 such as natural gas, propane, butane, or other similar petroleum-based gaseous fuel. The first and second fuel delivery ports 14, 16 can be defined within a drip tray 50 of the grilling appliance 12, where the drip tray 50 extends across the bottom surface 52 of the cooking area 54 for the grilling appliance 12. The first and second fuel delivery ports 14, 16 can be defined by apertures 56 that extend through the drip tray 50 and are in substantial communication with the fuel line 58 for the grilling appliance 12. The first and second small burner elements 20, 24 and the elongated burner element 28 each include at least one fuel inlet 30 that is configured to selectively extend through the aperture 56 defined within the drip tray 50. When one or more of the fuel inlets 30 are engaged with one of the first and second fuel delivery ports 14, 16, the fuel inlets 30 are configured to extend through the aperture 56 and into an interior 60 of the first and second fuel delivery ports 14, 16. Through this engagement, the first and second small burner elements 20, 24 and the elongated burner element 28 can be selectively placed in communication with the first and second fuel delivery ports 14, 16 and, in turn, the fuel line 58 for the grilling appliance 12 for delivering fuel 62 from a fuel source 64 to the cooking area 54 of the grilling appliance 12.

Referring again to FIGS. 1-5, each fuel inlet 30 of the first and second small burner elements 20, 24 and the elongated burner element 28 can define a Venturi tube 80 that can at least partially propel the movement of the gaseous fuel 62 from the fuel line 58 and through the respective burner element of the first small burner element 20, second small burner element 24 and elongated burner element 28. The Venturi tube 80 can define an orifice holder interface 82 of the fuel inlet 30 that extends through the aperture 56 and into the interior 60 of at least one of the first and second fuel delivery ports 14, 16. In this manner, the first and second small burner elements 20, 24 and the elongated burner element 28 can be removably placed upon the first and second fuel delivery ports 14, 16 and held therein through the force of gravity. It is also contemplated that the respective fuel inlets 30 for the first and second small burner elements 20, 24 and the elongated burner element 28 can also be held in place through a securing mechanism to prevent the fuel inlet 30 from becoming separated from the respective first or second fuel delivery port 14, 16.

Referring again to FIGS. 1-5, it is contemplated that the first and second small burner elements 20, 24 and the elongated burner element 28 can be configured as a stamped steel cavity burner having an interior cavity 90 through which the gaseous fuel 62 can be delivered. According to the various embodiments, the at least one ignitor 34 of the grilling appliance 12, which can include a first ignitor 92 disposed proximate the first fuel delivery port 14 and a second ignitor 94 disposed proximate the second fuel delivery port 16, are disposed in a fixed position with respect to the first and second fuel delivery ports 14, 16. In this manner, when the first and second small burner elements 20, 24 and the elongated burner element 28 are selectively interchanged, the position of the at least one ignitor 34 remains consistent among each of the single-burner condition 22, the twin-burner condition 26 and the large-burner condition 32. It is further contemplated that the at least one ignitor 34 can be a surface burner ignitor 34 that emits a small electrical spark for igniting a gaseous fuel 62 delivered from the fuel line 58, through at least one of the first and second fuel delivery ports 14, 16, and through one or more of the first and second small burner elements 20, 24 and the elongated burner element 28. In this manner, the gaseous fuel 62 can be ignited for heating the cooking area 54 of the grilling appliance 12 without modifying the ignitor 34 or the electrical components associated with the ignitor 34.

Referring again to FIGS. 1-5, the first and second small burner elements 20, 24 can include a series of burner apertures 110 that extend around the perimeter edge 112 of each of the first and second small burner elements 20, 24. The ignitor 34 can be utilized to ignite the gaseous fuel 62 of the burner apertures 110 such that the first and second small burner elements 20, 24 can be configured with no specific rotational orientation when installed in the first and second fuel delivery ports 14, 16. The elongated burner element 28 can also include a plurality of burner apertures 110 through which the gaseous fuel 62 can be delivered. The various burner apertures 110 of the elongated burner element 28 can include one or more ignition ports 120 positioned proximate one or more of the first and second ignitors 92, 94 of the grilling appliance 12. In this manner, main burner ports 122 that extend along the elongated edges 124 of the elongated burner element 28 can be ignited by one of the first and second ignitors 92, 94. Fuel 62 emitted from the main burner ports 122 along one of the elongated edges 124 of the elongated burner element 28 successively ignite along this elongated edge 124. The various burner apertures 110 can also include carry-over ports 126 disposed along the short edges 128 of the elongated burner element 28. The carry-over ports 126 are then successively ignited, whereby the carry-over ports 126 are ignited by the main burner ports 122 along one elongated edge 124 of the elongated burner element 28. The carry-over ports 126 are then successively ignited to ultimately ignite the main burner ports 122 on the opposing elongated edge 124 of the elongated burner element 28.

According to the various embodiments, it is further contemplated that when the elongated burner element 28 is disposed to define the large-burner condition 32, one of the first and second ignitors 92, 94 can be de-activated in the large-burner condition 32 such that a single ignitor 34 is used to ignite the ignition ports 120 of the elongated burner element 28. In various alternate embodiments, it is contemplated that two ignitors 34 can be used to ignite ignition ports 120 in separate locations of the elongated burner element 28.

Referring again to FIGS. 1-5, it is contemplated that the first and second fuel delivery ports 14, 16 can include a valve 140 or other operable mechanism to define a closed state 142 of one or both of the first and second fuel delivery ports 14, 16. In this manner, the closed state 142 can further be defined when either or both of the first and second fuel delivery ports 14, 16 are free of connection with one of the first and second small burner elements 20, 24 or the elongated burner element 28. Accordingly, when none of the first small burner elements 20, the second small burner element 24 and the elongated small burner elements are engaged with one or both of the first or second fuel delivery ports 14, 16, the unengaged first and/or second fuel delivery port 14, 16 is free of the delivery of fuel 62. In this manner, the valve 140 or other operable mechanism within the fuel line 58 leading to one or both of the first and second fuel delivery ports 14, 16 can be moved into the closed state 142 to prevent the delivery of fuel 62 from the other of the first or second fuel delivery ports 14, 16 that is unengaged within a fuel inlet 30. The activation or deactivation of the valve 140 that operates the first or second fuel delivery ports 14, 16 defined in the closed state 142 can be manually operated through a control 150 of the grilling appliance 12.

It is also contemplated that the valve 140 for activating and deactivating the first and/or second fuel delivery ports 14, 16 can be automatically triggered when a fuel inlet 30 is inserted within the aperture 56 of one of the first and second fuel delivery ports 14, 16. This trigger for operating the valve 140 can be a mechanically operated lever that is moved as the fuel inlet 30 is inserted through the aperture 56 of the first and/or second fuel delivery port 14, 16. The mechanism for operating the valve 140 can also be an electrical trigger, a magnetic trigger, a wirelessly communicated signal, combinations thereof, or other similar mechanical, electrical, magnetic or wireless mechanism. In this manner, the first and second fuel delivery ports 14, 16 are in selective communication with a fuel source 64.

Referring now to FIGS. 1-9, according to various embodiments, gaseous fuel 62 from the fuel source 64 may be selectively delivered to only one of the first and second fuel delivery ports 14, 16 when the interchangeable dual inlet burner system 10 is in the single-burner condition 22. As discussed above, the single-burner condition 22 is defined by only one of the first and second small burner elements 20, 24 being positioned in either the first or second fuel delivery port 14, 16. Either of the first and second fuel delivery ports 14, 16, when no fuel inlet 30 disposed therein can be placed in the closed state 142 so that gaseous fuel 62 cannot be delivered therethrough. Alternatively, fuel 62 from the fuel source 64 can be selectively delivered to both of the first and second fuel delivery ports 14, 16 in the twin-burner condition 26 and the large-burner condition 32. As discussed above, the twin-burner and large-burner conditions 26, 32 are defined by fuel inlets 30 being disposed in both the first and second fuel delivery ports 14, 16 from either the first and second small burner elements 20, 24 or the elongated burner element 28.

Referring again to FIGS. 1-9, in addition to the valve assembly combining the closed state 142 of the first and second fuel delivery ports 14, 16, the first and second fuel delivery ports 14, 16 can also be operated by the control 150 for the grilling appliance 12. In this manner, the user interface 160 for the grilling appliance 12 can operate the control 150 to selectively define the flow rate of the gaseous fuel 62 delivered through the first and second fuel delivery ports 14, 16. By way of example, and not limitation, when the interchangeable dual inlet burner system 10 is placed in the twin-burner condition 26, two separate user interface mechanisms of the control 150 can be separately and individually operated to adjust the flow of gaseous fuel 62 through the first and second fuel delivery ports 14, 16, such that the amount of ignited gaseous fuel 62 emanating from the first and second small burner elements 20, 24 is independently operated to provide for independent amounts of heat provided therefrom.

Figure 8:
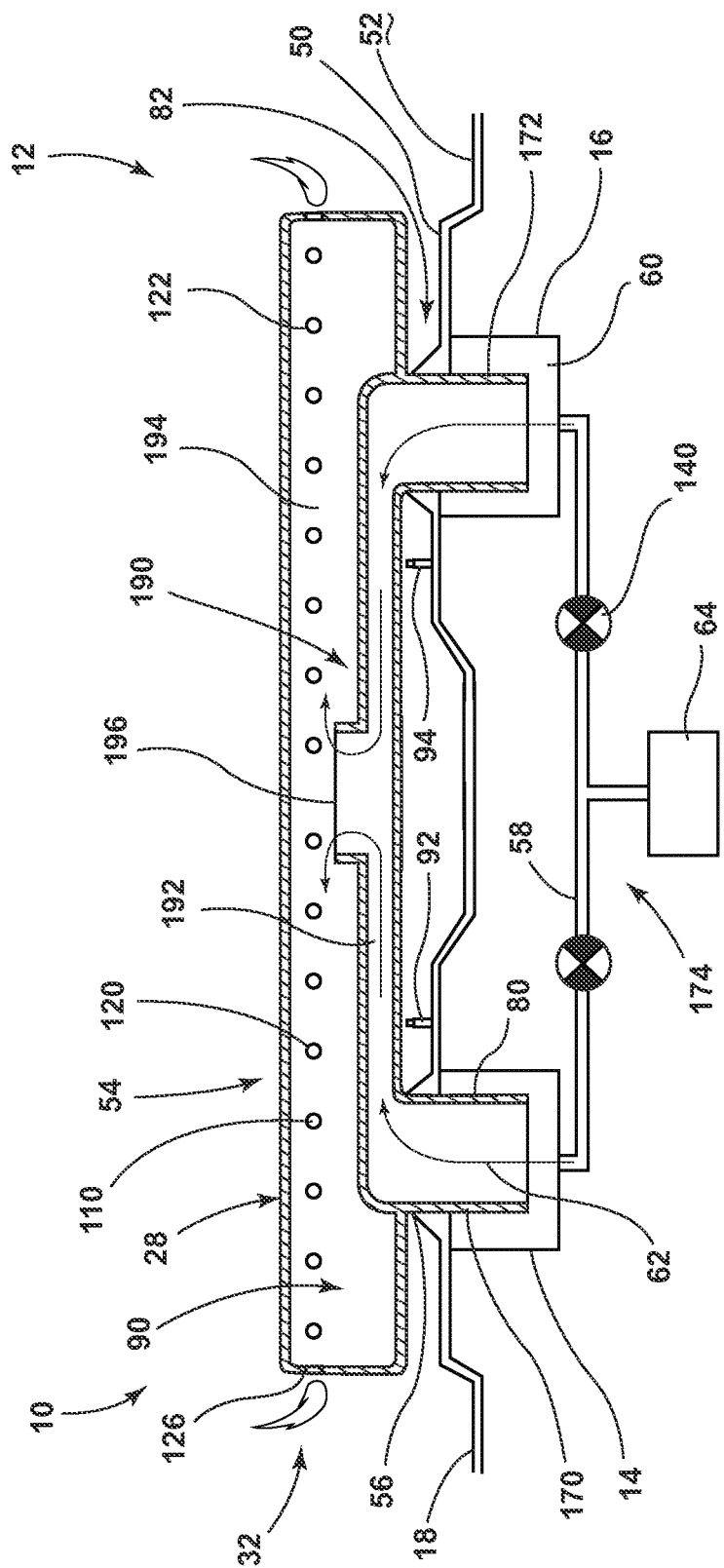
FIG. 8 is a cross-sectional view of the grilling appliance of FIG. 3 taken along line VIII-VIII and illustrating the large-burner condition of the grilling appliance where the first and second fuel delivery ports are in communication with the elongated burner element.
Figure 9:
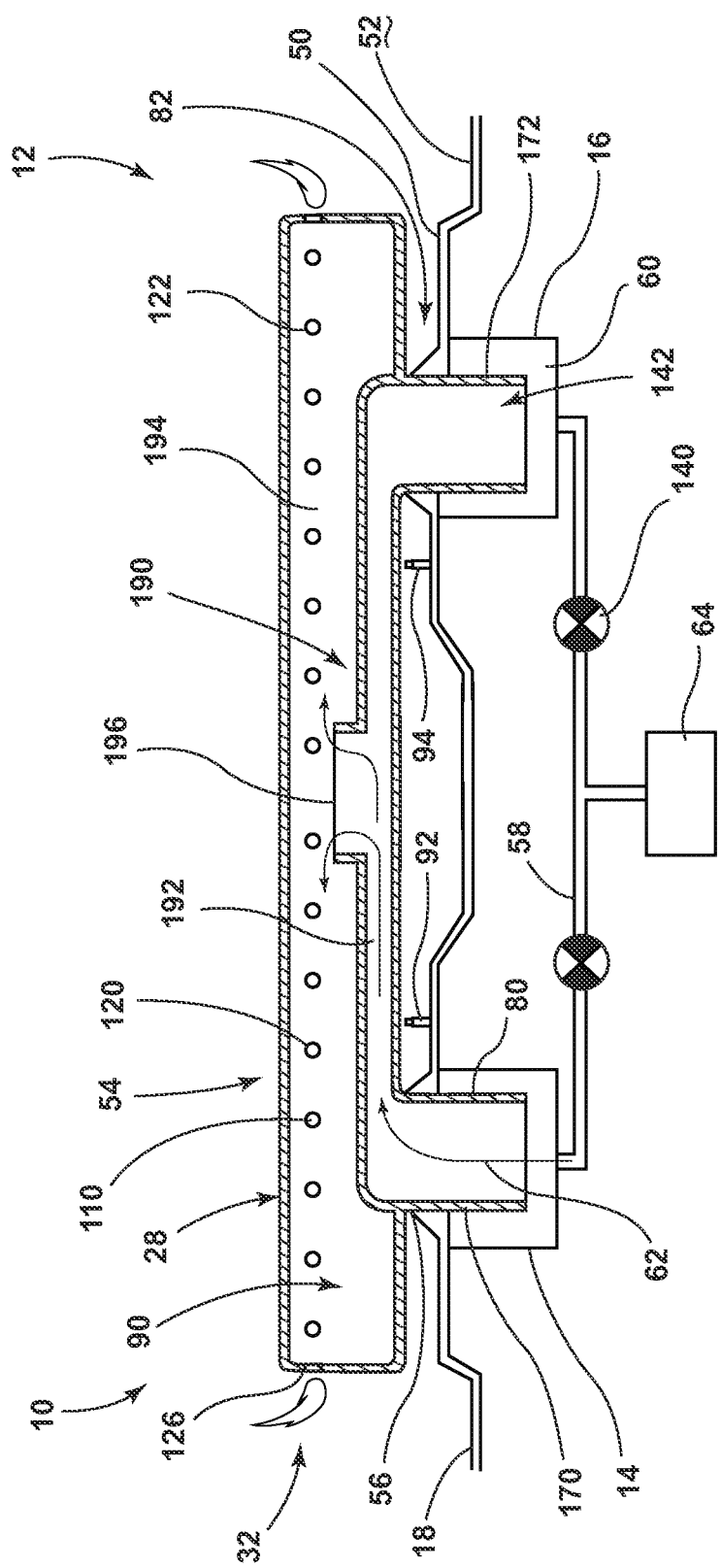
FIG. 9 is a cross-sectional view of the grilling appliance of FIG. 8 having one of the first and second fuel delivery ports in a deactivated state.

According to aspects of the device exemplified in FIGS. 8 and 9, it is also contemplated that when the elongated burner element 28 is disposed in the first and second fuel delivery ports 14, 16, the engagement of the first and second fuel inlets 170, 172 with the first and second fuel delivery ports 14, 16 can define a unitary control state 174 of the control 150 for the grilling appliance 12. In this manner, the first and second fuel delivery ports 14, 16 can be simultaneously operated by a single user interface 160 when the interchangeable dual inlet burner system 10 is in the large-burner condition 32. Accordingly, when the elongated burner element 28 is disposed in the first and second fuel delivery ports 14, 16, the engagement of the first and second fuel inlets 170, 172 activates a mechanism of the control 150 to allow for the operation of the unitary control state 174.

Referring again to FIGS. 8 and 9, it is also contemplated that the interchangeable dual inlet burner system 10 could be configured such that only one of the first and second fuel delivery ports 14, 16 is activated when in the large-burner condition 32. In such an embodiment, when the elongated burner element 28 is installed to define the large-burner condition 32, only gaseous fuel 62 from one of the first and second fuel delivery ports 14, 16 is utilized by the elongated burner element 28. According to various embodiments, it is also contemplated that the first and second fuel delivery ports 14, 16 can be independently operated to vary the amount of fuel 62 that can be delivered through the elongated burner element 28. In such an embodiment, it is contemplated that the amount of gaseous fuel 62 delivered through the ignition ports 120, carry-over ports 126 and main burner ports 122 of the elongated burner element 28 remains consistent as the controls 150 for the first and second fuel delivery ports 14, 16 are separately adjusted.

According to various embodiments, each fuel inlet 30 of the first and second small burner element 20, 24 and the elongated burner element 28 can include a separate valve engagement feature that selectively activates or deactivates the valves 140 for the first and second fuel delivery ports 14, 16. In this manner, each fuel inlet 30 can engage the first and/or second fuel delivery ports 14, 16 to appropriately communicate the positioning of the valve 140 to at least partially control the flow of gaseous fuel 62 to the first and second fuel delivery ports 14, 16. Such valve engagement features can include, but are not limited to, physical engagement features, radio-frequency identification (RFID) tags, magnetic features, electrical features, combinations thereof and other similar engagement mechanisms for operating the valves 140 of the first and second fuel delivery ports 14, 16.

Referring again to FIGS. 6-9, the grilling appliance 12 can include the first and second fuel delivery ports 14, 16 that are in selective communication with at least one ignitor 34. The first and second small burner elements 20, 24 can be selectively engageable with at least one of the first and second fuel delivery ports 14, 16 to define the single-burner condition 22 and the twin-burner condition 26. As discussed above, the single-burner condition 22 is defined by one of the first and second small burner elements 20, 24 being in communication with one of the first and second fuel delivery ports 14, 16, and the other of the first and second small burner elements 20, 24 being out of communication with the other of the first and second fuel delivery ports 14, 16. As also discussed above, the twin-burner condition 26 is defined by the first and second small burner elements 20, 24 being in communication with the first and second fuel delivery ports 14, 16. The elongated burner element 28 selectively and alternatively engageable with the first and second fuel delivery ports 14, 16 to define the large-burner condition 32.

Referring again to FIGS. 8 and 9, the elongated burner element 28 can include the first and second fuel inlets 170, 172, and a plurality of burner apertures 110 that extend around the elongated edges 124 and short edges 128 of the elongated burner element 28. The elongated burner element

28 can also include an internal fuel delivery structure 190 that places each burner aperture 110 of the plurality of burner apertures 110 in communication with each of the first and second fuel inlets 170, 172. In this manner, it is contemplated that the first and second fuel inlets 170, 172 of the elongated burner element 28 can be connected with a central channel 192 that substantially distributes the gaseous fuel 62 throughout the fuel delivery chamber 194 of the elongated burner element 28. The central channel 192 can include a single delivery aperture 196 or a plurality of delivery apertures 196 through which the gaseous fuel 62 can be evenly delivered or substantially evenly delivered throughout the fuel delivery chamber 194 of the elongated burner element 28.

Referring again to FIGS. 1-5, it is contemplated that the first and second small burner elements 20, 24 can be the same size such that the twin-burner condition 26 is defined by two identically shaped burner elements positioned in the first and second fuel delivery ports 14, 16. Alternatively, it is contemplated that the first small burner element 20 is of a different size than that of the second small burner element 24. By way of example, and not limitation, the first small burner element 20 can include a first width or diameter and the second small burner element 24 can include a second width or diameter, where the first width or diameter is greater than the second width or diameter. In this manner, it is contemplated that the first small burner element 20 can be larger than the second small burner element 24. In this manner, the single-burner condition 22 can be separated into a small-burner condition 210 where the second small burner element 24 is disposed in one of the first and second fuel delivery ports 14, 16 and an intermediate-burner condition 212 where the first small burner element 20, being larger than the second small burner element 24, is disposed within one of the first and second fuel delivery ports 14, 16. Additionally, the twin-burner condition 26, in such an embodiment, can include burners of different sizes to accommodate cooking utensils (not shown) that may be of different sizes. It is also contemplated that the first and second small burner elements 20, 24 can be any one or more of various shapes. Such shapes can include, but are not limited to, round, square, arcuate, linear, polygonal, irregular, combinations thereof, and other similar shapes. It is also contemplated that the first and second small burner elements 20, 24 can be the same shape, or can be different shapes.

According to the various embodiments, the first and second small burner elements 20, 24 and the elongated burner element 28 that define the single-burner, twin-burner, and large-burner conditions 22, 26, 32, can be configured to be interchangeable such that cooking utensils of various sizes can be used upon the grilling appliance 12. The large-burner condition 32 being typically used for large or generally elongated cooking utensils, the twin-burner condition 26 being typically used for separate smaller cooking utensils, and the single-burner condition 22 being typically used for a single smaller cooking utensil.

Referring again to FIGS. 1-9, the grilling appliance 12 can include a set of burner elements 220 that can be used in conjunction with the interchangeable dual inlet burner system 10. The grilling appliance 12 can also include a plurality of fuel delivery ports 222, wherein the set of burner elements 220 are selectively and interchangeably engaged with at least one of the plurality of fuel delivery ports 222 to define a plurality of burner conditions. Additionally, at least one ignitor 34 can be placed in communication with the plurality of fuel delivery ports 222 in each of the burner conditions. It is contemplated that in such an embodiment, the at least one ignitor 34 is in a fixed position with respect to the plurality of fuel delivery ports 222. In such an embodiment, it is contemplated that the set of burner elements 220 can correspond to the first and second small burner elements 20, 24 and the elongated burner element 28 and the plurality of fuel delivery ports 222 can correspond to the first and second fuel delivery ports 14, 16.

According to the various embodiments, it is contemplated that the set of burner elements 220 can include additional burner elements that can be used to define additional burner conditions. Moreover, the grilling appliance 12 can include more than a first and second fuel delivery port 14, 16 such that three or more fuel delivery ports 222 can be included for defining the plurality of burner conditions for the grilling appliance 12. Such burner elements 220 and fuel delivery ports 222 can be configured in combination to cooperatively define burner configurations having various shapes and sizes. Such burner configurations can include U-shaped configurations, L-shaped configurations, parallel configurations, perpendicular configurations, T-shaped configurations, multiple single-burner configurations, multiple elongated burner configurations, combinations thereof and other similar burner configurations. In each of the configurations contemplated by the set of burner elements 220 and the plurality of fuel delivery ports 222, the at least one ignitor 34 for the interchangeable dual inlet burner system 10 is in a fixed position with respect to the plurality of fuel delivery ports 222.

Referring again to FIGS. 2-9, the interchangeable dual inlet burner system 10 can be used in conjunction with various accessories, where such accessories can include, but are not limited to, a radiant heat shield 240 that can be disposed over the first and second fuel delivery ports 14, 16 where the radiant heat shield 240 is disposed under the utensil support grate 242. The radiant heat shield 240 is configured to prevent, or substantially prevent, direct flame from engaging the utensil disposed upon the utensil support grate 242 or food that is disposed directly upon the utensil support grate 242. The interchangeable dual inlet burner system 10 can also be used in conjunction with flavor bars and/or water trays for cooking with steam and/or smoking various food items placed upon the utensil support grate 242. The interchangeable dual inlet burner system 10 can also include various support grates 242 and griddle attachments 244 that provide various alternative cooking surfaces that can be implemented during use of the grilling appliance 12.

Referring again to FIGS. 1-9, in use, the interchangeable dual inlet burner system 10 for the grilling appliance 12 can be configured for use by placing one or more of the first and second small burner elements 20, 24 or the elongated burner element 28 into position such that the fuel inlets 30 are disposed through the aperture 56 of one or both of the first and second fuel delivery ports 14, 16. Insertion of the various fuel inlets 30 within the first and/or second fuel delivery ports 14, 16 can activate various aspects of the control 150 to configure operation of the user interface 160, and also configure the amount of fuel 62 delivered through one or both of the first and second fuel delivery ports 14, 16. Once the desired burner element is engaged, the support grate 242 and/or various other attachments can be disposed above the first and second fuel delivery ports 14, 16 to conduct various cooking operations. When a different cooking operation or cooking condition is desired, the support grate 242 can be removed and the currently installed removable burner of the first and second small burner elements 20, 24 and the elongated burner element 28 can be removed from the first and/or second fuel delivery ports 14, 16.

According to the various embodiments, the engagement of the respective set of burner elements 220 with the first and second fuel delivery ports 14, 16 can be a gravity connection that may have no additional mechanical, interference, magnetic, or other additional securing mechanism. The configuration of the interchangeable dual inlet burner system 10 can then be changed to the newly desired configuration by sliding the fuel inlet 30 of the burner element out of the one or both of the first and second fuel delivery ports 14, 16 and inserting the new burner element into at least one of the first and second fuel delivery ports 14, 16 to achieve the newly desired burner configuration. According to various embodiments, the burner configuration incorporated within the interchangeable dual inlet burner system 10 and the independent configuration of the fuel inlets 30 can dictate the amount of gaseous fuel 62 delivered through the fuel line 58 and into one or both of the first and second fuel delivery ports 14, 16.

According to the various embodiments, the interchangeable dual inlet burner system 10 can be implemented in various appliances that can include, but are not limited to, outdoor grills, indoor grills, propane grills, natural gas grills, grills having removable fuel tanks, grills that are coupled to gaseous fuel lines, combinations thereof, and other similar grilling appliances 12.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A grilling appliance comprising:
   first and second fuel delivery ports extending from a grill housing;
   a first burner element selectively connected to one of the first and second fuel delivery ports to define a single-burner condition;
   a second burner element selectively connected to the other of the first and second fuel delivery ports to define, with the first burner element, a twin-burner condition;
   an elongated burner element having two fuel inlets selectively connected to the first and second fuel delivery ports to define, when the first and second burner elements are removed from the first and second fuel delivery ports, a large-burner condition; and
   at least one ignitor in communication with the first burner element in the single-burner condition, the first and second burner elements in the twin-burner condition and the elongated burner element in the large-burner condition, wherein the at least one ignitor is in a fixed position within the grill housing in the single-burner, twin-burner and large-burner conditions.

2. The grilling appliance of claim 1, wherein the each of the first and second fuel delivery ports define a closed state when free of connection with one of the first burner element, the second burner element and the elongated burner element, wherein the closed state is defined by at least one of the first and second fuel delivery ports being free of delivery of fuel.

3. The grilling appliance of claim 1, wherein the at least one ignitor includes a first ignitor proximate the first fuel delivery port and a second ignitor proximate the second fuel delivery port.

4. The grilling appliance of claim 3, wherein one of the first and second ignitors is deactivated in the large-burner condition.

5. The grilling appliance of claim 1, wherein the first and second fuel delivery ports are in communication with a fuel source, wherein fuel from the fuel source is selectively delivered to one of the first and second fuel delivery ports in the single-burner condition, and wherein fuel from the fuel source is selectively delivered to at least one of the first and second fuel delivery ports in the twin-burner and large-burner conditions.

6. The grilling appliance of claim 1, wherein the first and second fuel delivery ports are simultaneously controlled by a single user interface when in the large-burner condition.

7. The grilling appliance of claim 1, wherein the first and second fuel delivery ports are in communication with a natural gaseous fuel line.

8. A grilling appliance comprising:
   first and second fuel delivery ports in selective communication with at least one ignitor;
   first and second small burner elements selectively engagable with at least one of the first and second fuel delivery ports to define a single-burner condition and a twin-burner condition, wherein the single-burner condition is defined by one of the first and second small burner elements being in communication with one of the first and second fuel delivery ports and the other of the first and second small burner elements being out of communication with the other of the first and second fuel delivery ports, and wherein the twin-burner condition is defined by the first small burner element being in communication with one of the first and second fuel delivery ports and the second small burner element being in communication with the other of the first and second fuel delivery ports; and
   an elongated burner element alternatively engagable with the first and second fuel delivery ports to define a large-burner condition, wherein the first and second fuel delivery ports are simultaneously controlled by a single user interface when in the large-burner condition.

9. The grilling appliance of claim 8, wherein the first small burner element has a first width and the second small burner element has a second width, wherein the first width is greater than the second width.

10. The grilling appliance of claim 8, wherein the elongated burner element includes first and second fuel inlets and a plurality of burner apertures extending around a perimeter edge of the elongated burner element, and wherein the elongated burner element includes an internal fuel delivery structure that places each burner aperture of the plurality of burner apertures in communication with each of the first and second fuel inlets.

11. The grilling appliance of claim 8, wherein the at least one ignitor is in a fixed position within a grill housing in the single-burner, twin-burner and large-burner conditions.

12. The grilling appliance of claim 8, wherein the at least one ignitor includes a first ignitor proximate the first fuel delivery port and a second ignitor proximate the second fuel delivery port.

13. The grilling appliance of claim 8, wherein the each of the first and second fuel delivery ports define a closed state when free of connection with one of the first small burner element, the second small burner element and the elongated burner element, wherein the closed state is defined by at least one of the first and second fuel delivery ports being free of delivery of fuel.

14. The grilling appliance of claim 12, wherein one of the first and second ignitors is deactivated in the large-burner condition.

15. The grilling appliance of claim 8, wherein the first and second fuel delivery ports are in communication with a fuel source, wherein fuel from the fuel source is selectively delivered to one of the first and second fuel delivery ports in the single-burner condition, and wherein fuel from the fuel source is selectively delivered to at least one of the first and second fuel delivery ports in the twin-burner and large-burner conditions.

16. A grilling appliance comprising:
   a set of burner elements;
   a plurality of fuel delivery ports, wherein the set of burner elements are selectively and interchangeably engaged with at least one of the fuel delivery ports to define a plurality of burner conditions, wherein each fuel delivery port of the plurality of fuel delivery ports defines a closed state when disengaged from the set of burner elements;
   at least one ignitor in communication with the plurality of fuel delivery ports in each of the burner conditions, wherein the at least one ignitor is in a fixed position with respect to the plurality of fuel delivery ports.

17. The grilling appliance of claim 16, wherein the set of burner elements includes first and second small burner elements and an elongated burner element, and wherein the plurality of burner conditions includes a single-burner condition defined by one of the first and second small burner elements being in communication with one of a first fuel delivery port and a second fuel delivery port of the plurality of fuel delivery ports, a twin-burner condition defined by the first and second small burner elements being in communication with the first and second fuel delivery ports, respectively, and a large-burner condition defined by the elongated burner element being in communication with the first and second fuel delivery ports.

18. The grilling appliance of claim 17, wherein the at least one ignitor includes a first ignitor proximate the first fuel delivery port and a second ignitor proximate the second fuel delivery port, and wherein one of the first and second ignitors is deactivated in the large-burner condition.

* * * * *